US010770107B1

(12) United States Patent
Abe et al.

(10) Patent No.: US 10,770,107 B1
(45) Date of Patent: Sep. 8, 2020

(54) ADAPTIVE TENSION POSITION CHANGING FOR MAGNETIC TAPE RECORDING DEVICE

(71) Applicant: International Business Machines Corporation, Armonk, NY (US)

(72) Inventors: Atsushi Abe, Ebina (JP); Tsuyoshi Miyamura, Yokohama (JP); Eiji Ogura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/430,546

(22) Filed: Jun. 4, 2019

(51) Int. Cl.
| G11B 5/584 | (2006.01) |
| G11B 15/087 | (2006.01) |
| G11B 15/43 | (2006.01) |
| G11B 5/008 | (2006.01) |
| G11B 5/55 | (2006.01) |
| G11B 5/588 | (2006.01) |

(52) U.S. Cl.
CPC ........ *G11B 15/087* (2013.01); *G11B 5/00813* (2013.01); *G11B 15/43* (2013.01); *G11B 5/00817* (2013.01); *G11B 5/00878* (2013.01); *G11B 5/5504* (2013.01); *G11B 5/5513* (2013.01); *G11B 5/5517* (2013.01); *G11B 5/584* (2013.01); *G11B 5/588* (2013.01)

(58) Field of Classification Search
None
See application file for complete search history.

(56) References Cited

U.S. PATENT DOCUMENTS

| 4,176,380 | A | * | 11/1979 | Koski | ................ | G11B 20/1201 360/50 |
| 5,039,027 | A | * | 8/1991 | Yanagihara | ............ | G11B 15/43 242/334.2 |
| 5,552,943 | A | * | 9/1996 | Hirano | ................ | G11B 15/005 360/72.2 |
| 5,923,494 | A | * | 7/1999 | Arisaka | ................ | G11B 5/5504 360/75 |

(Continued)

FOREIGN PATENT DOCUMENTS

CN          108630883 A      10/2018

OTHER PUBLICATIONS

Abe et al., "Adaptive Tension Position Change on Tape Drive", U.S. Appl. No. 16/430,537, filed Jun. 4, 2019.

(Continued)

*Primary Examiner* — Tan X Dinh
(74) *Attorney, Agent, or Firm* — Scott S. Dobson

(57) ABSTRACT

Provided is a method, computer program product, and system for handling seek commands for a tape drive. The method includes receiving a seek command for moving tape in the tape drive to a target position. The method further includes determining whether to move the tape according to a first procedure or a second procedure. The first procedure includes directly moving the tape from the current position to the target position with the tape at the first tension. The second procedure includes moving the tape from the current position to the HWM with the tape at the first tension and moving the tape from the HWM to the target position with the tape at the second tension. The method further includes moving the tape according to the determined first or second procedure.

20 Claims, 13 Drawing Sheets

(56) References Cited

U.S. PATENT DOCUMENTS

| | | | | |
|---|---|---|---|---|
| 6,307,701 | B1* | 10/2001 | Beavers | G11B 5/0086 |
| | | | | 360/53 |
| 7,023,651 | B1* | 4/2006 | Peterson | G11B 5/584 |
| | | | | 360/77.12 |
| 8,234,443 | B2* | 7/2012 | Katagiri | G11B 20/10527 |
| | | | | 360/73.06 |
| 8,316,162 | B2* | 11/2012 | Katagiri | G11B 15/46 |
| | | | | 710/52 |
| 8,982,500 | B1* | 3/2015 | Cherubini | G11B 15/43 |
| | | | | 242/324 |
| 9,251,840 | B2* | 2/2016 | Bui | G11B 15/06 |
| 9,959,892 | B1* | 5/2018 | Miyamura | G11B 20/1201 |
| 10,437,511 | B2* | 10/2019 | Miyamura | G06F 3/0656 |
| 2004/0041047 | A1* | 3/2004 | Karp | G11B 15/43 |
| | | | | 242/334.3 |
| 2017/0330592 | A1 | 11/2017 | Erpelding et al. | |
| 2018/0374508 | A1 | 12/2018 | Pantazi et al. | |
| 2019/0001722 | A1 | 1/2019 | McNestry et al. | |

OTHER PUBLICATIONS

List of IBM Patents or Patent Applications Treated as Related, dated Jun. 3, 2019, 2 pages.

* cited by examiner

ADAPTIVE TENSION POSITION CHANGING FOR MAGNETIC TAPE RECORDING DEVICE

BACKGROUND

The present disclosure relates to data storage systems, and more particularly, relates to tape position change and tape tension in tape drives.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape and decreasing the thickness of the magnetic tape medium. However, the development of a smaller footprint in higher performance tape drive systems has created various challenges ranging from the design of tape head assemblies for use in such systems to dealing with tape dimensional instability.

SUMMARY

Embodiments of the present disclosure include a method, computer program product, and system for handling seek commands for a tape drive. The method includes receiving a seek command for moving tape in the tape drive to a target position. The method further includes determining, based on a current position of the tape, the target position, a high water mark for the tape, a first speed of moving the tape at a first tension, and a second speed of moving the tape at a second tension, whether to move the tape according to a first procedure or a second procedure. The first procedure includes directly moving the tape from the current position to the target position with the tape at the first tension. The second procedure includes moving the tape from the current position to the HWM with the tape at the first tension and moving the tape from the HWM to the target position with the tape at the second tension. The method further includes moving the tape according to the determined first or second procedure.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1A:
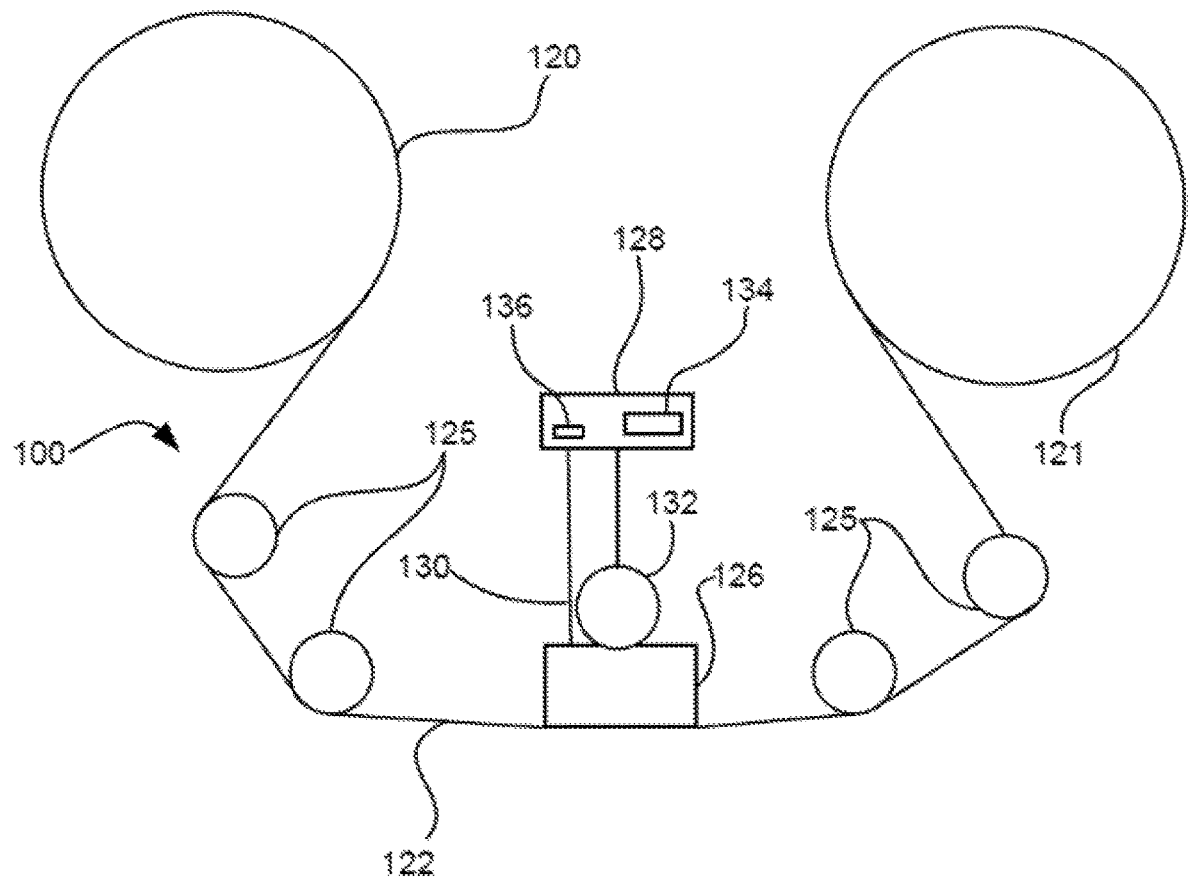
FIG. 1A is a schematic diagram of a simplified tape drive system, in accordance with embodiments of the present disclosure.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several embodiments of magnetic storage systems, as well as operation and/or component parts thereof.

Tape media are widely used as a removable, sequentially accessible, and cost-effective data storage media. A tape drive writes data to a tape sequentially along the length of the tape. Once reading and/or writing of data are completed, the tape cartridge may be unloaded to make the tape drive available for other tape cartridges as needed.

When reading and/or writing data on a tape, the tape drive pulls the tape with a particular level of tension (normal tension) such that a drive head contacts the surface of the tape uniformly. If the tape is rewound to the tape cartridge with the same level of tension as used for reading/writing data before unloading the tape, the tape may be widened by the pressure applied to the tape. If the tape is widened, the tape drive may fail to properly read data written on the tape as the track pitches may change while the distance between data reader cells on the tape drive head may remain constant.

To address this issue, some tape drives are configured to completely unwind the tape to the end of tape with the tension used for reading and writing to tape (normal tension) and rewind the tape to the cartridge at a lower tension than the normal tension (low tension) during the unload process. However, this process can result in a long unload time, particularly when the current position of the tape is near the beginning of tape.

To address this issue, tape drives may be configured to perform an adaptive unload of the tape. Adaptive unload refers to maintaining a high water mark (HWM) and only unwinding the tape to the HWM, instead of the end of tape, before rewinding the tape at the low tension. The HWM is the position on the tape that needs to be reached to ensure that all the tape is wound on the cartridge at low tension. Typically, the HWM is the furthest position on the tape that the tape has been unwound to since the tape has been loaded. Thus, when the HWM is not at the end of tape, the time that it would take to unwind the tape from the HWM to the end of tape and rewind the tape from the end of tape to the HWM is saved during the unload process. However, the more data that is read or written since the tape has been loaded increases the likelihood that the HWM will be at or near the end of tape, thus negating the time advantage of adaptive unload.

Embodiments of the present disclosure provide a method, computer program product, and system for responding to seek commands based on the current position of the tape, the HWM, and the target position of the seek command. In certain situations, according to embodiments described herein, the tape drive may unwind the tape to the HWM at normal tension and then move to the target position at low tension. This allows for the HWM to be changed to the target position as the tape has been wound from the previous HWM to the target position at low tension. With an HWM closer to the beginning of tape, adaptive unload may be performed faster. Thus, a first benefit of embodiments of the present disclosure is that the time for completing the process of adaptive unload may be decreased.

Further, it has been found in certain tape drives (e.g., IBM TS 1155 and TS 1160) that tape can be moved faster with a low tension than moving the tape with normal tension. For example, in certain tape drives the tape runs at a speed of 6 m/s at normal tension and a speed of 18 m/s at low tension. When a tape is wound partially with normal tension and partially with low tension, adverse side effects can occur in reading and writing to the tape. Thus, the tape may be moved at normal tension when moving from beginning of tape to end of tape and when moving toward the beginning of tape when the current position is not at the HWM.

Given the speed differences, unwinding the tape to the HWM at normal tension and then winding the tape to the target position at low tension may provide the additional benefit of moving the tape to the target position faster than a direct winding of the tape from the current position to the target position at normal tension.

According to some embodiments described herein, in response to receiving a seek command, it is determined whether it is faster to move the tape directly to the target position at normal tension, or to move the tape to the HWM at normal tension and then move the tape from the HWM to the target position at low tension. The tape may then be controlled according to the faster procedure. Thus, performing the position change according to a seek command may be accomplished faster in certain circumstances, while also reducing the time for adaptive unload by changing the HWM.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motors to drive the tape supply cartridge 120 and the take-up reel 121 to move the tape 122 over a tape head 126 of any type. Such head may include an array of readers, writers, or both. As used herein, the term unwind may refer to the movement of tape from the supply cartridge to the take-up reel, and the term rewind may refer to the movement of tape from the take-up reel to the supply cartridge.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may control the power of the motors driving the tape supply cartridge and the tape reel such that a constant tension is applied to the tape. According to embodiments, the controller may change the tension applied to the tape between a normal tension and a low tension as described herein. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. In some embodiments, controller 128 may store the HWM in memory 136. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
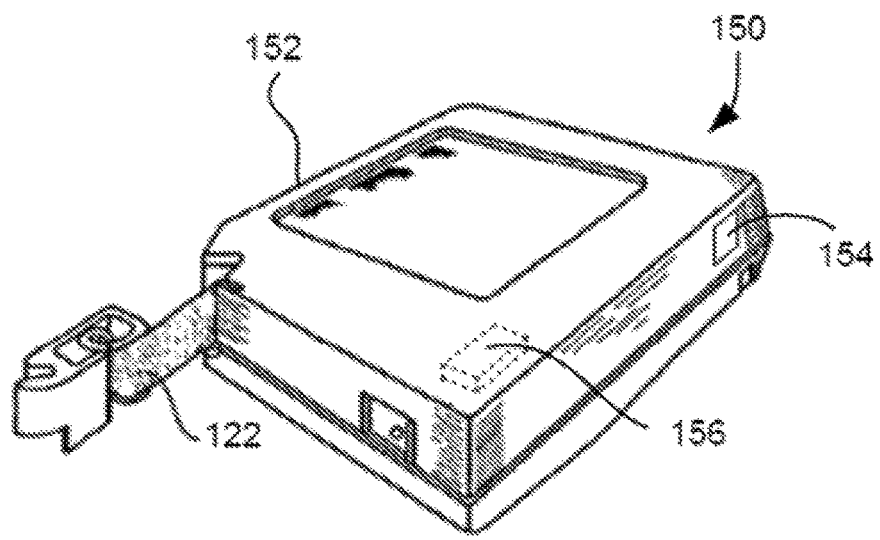
FIG. 1B is a schematic diagram of a tape cartridge, in accordance with embodiments of the present disclosure.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In some embodiments, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device. In some embodiments. nonvolatile memory 156 may be used to store the HWM.

Figure 2A:
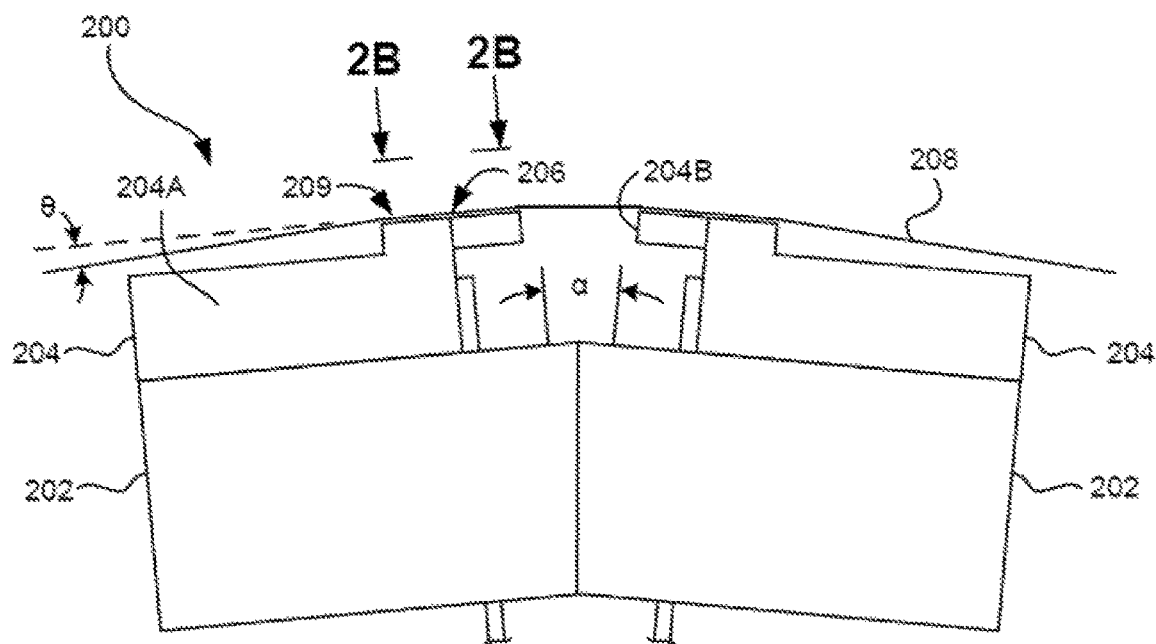
FIG. 2A illustrates a side view of a flat-lapped, bi-directional, two-module magnetic tape head, in accordance with embodiments of the present disclosure.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle at with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
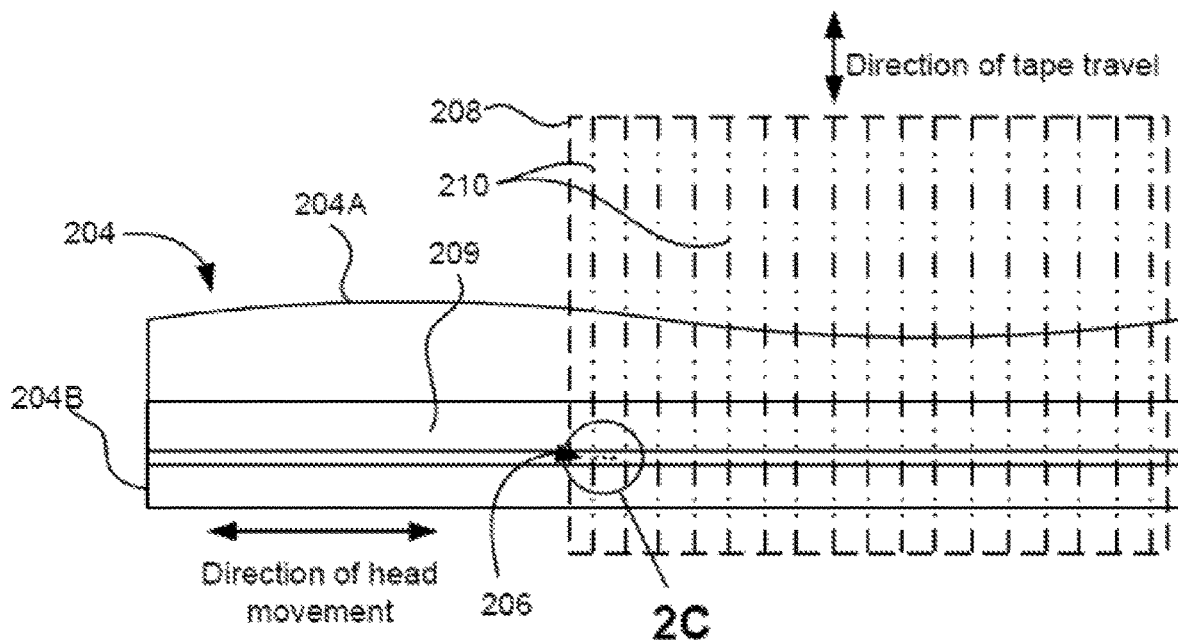
FIG. 2B is a tape bearing surface view taken from Line 2B of FIG. 2A, in accordance with embodiments of the present disclosure.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
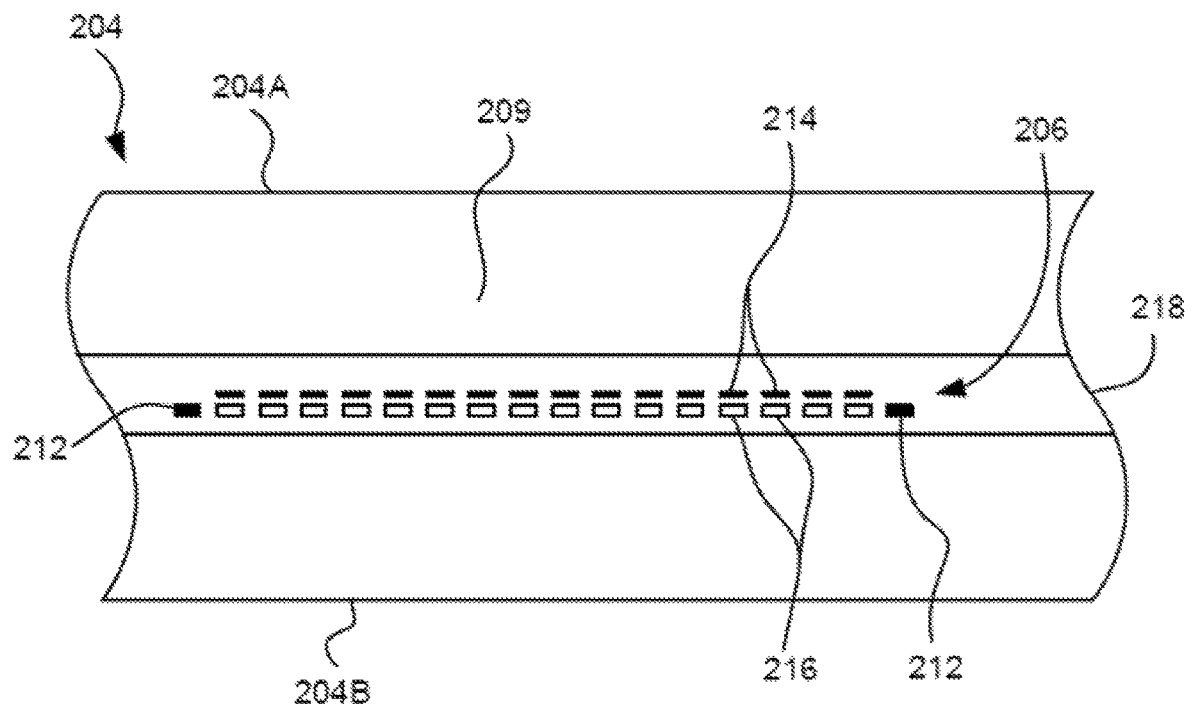
FIG. 2C is a detailed view taken from Circle 2C of FIG. 2B, in accordance with embodiments of the present disclosure.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
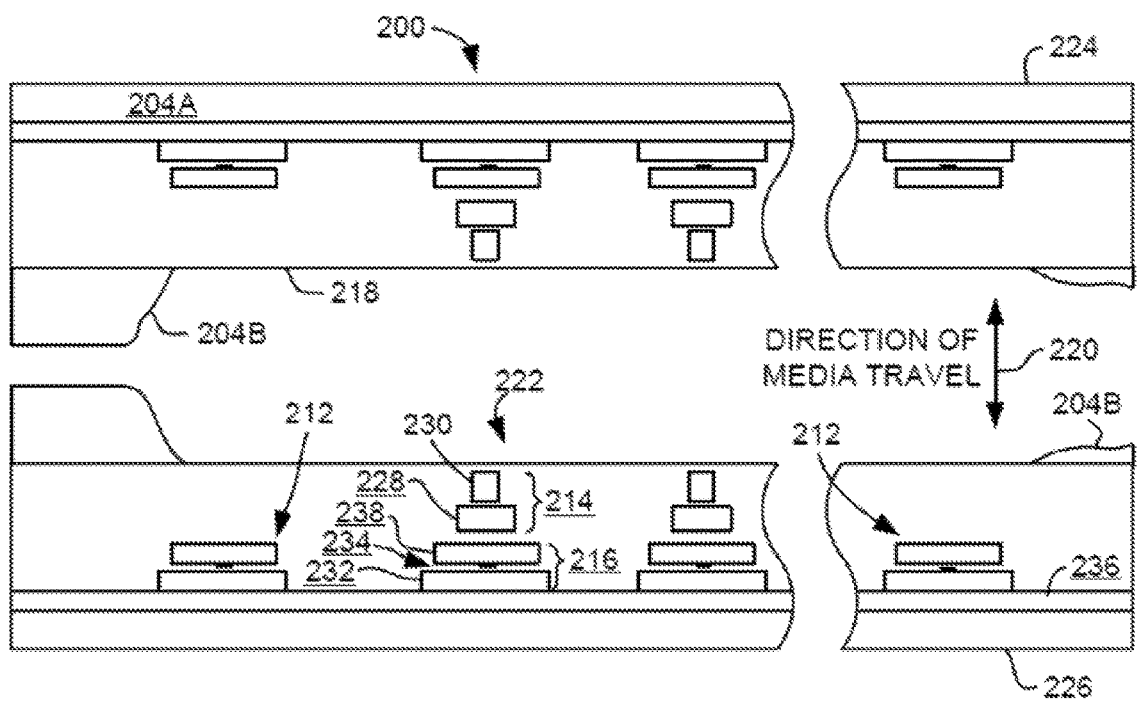
FIG. 2D is a detailed view of a partial tape bearing surface of a pair of modules, in accordance with embodiments of the present disclosure.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative insulating layer 236. The writers 214 and the readers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
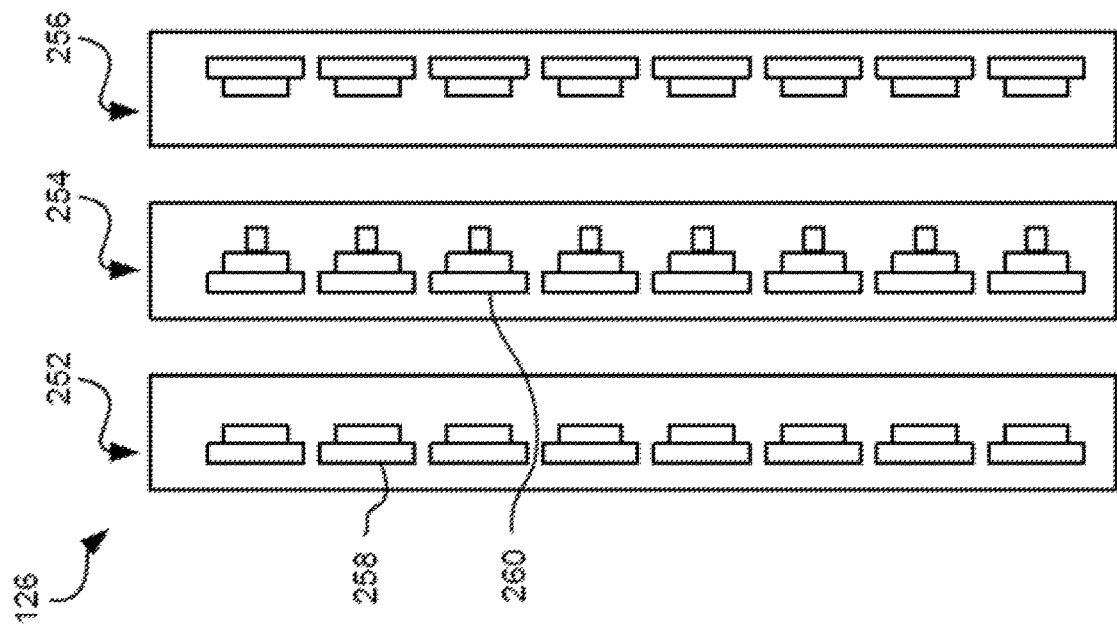
FIG. 4 is a partial tape bearing surface view of a magnetic head having a read-write-read configuration, in accordance with embodiments of the present disclosure.
Figure 3:
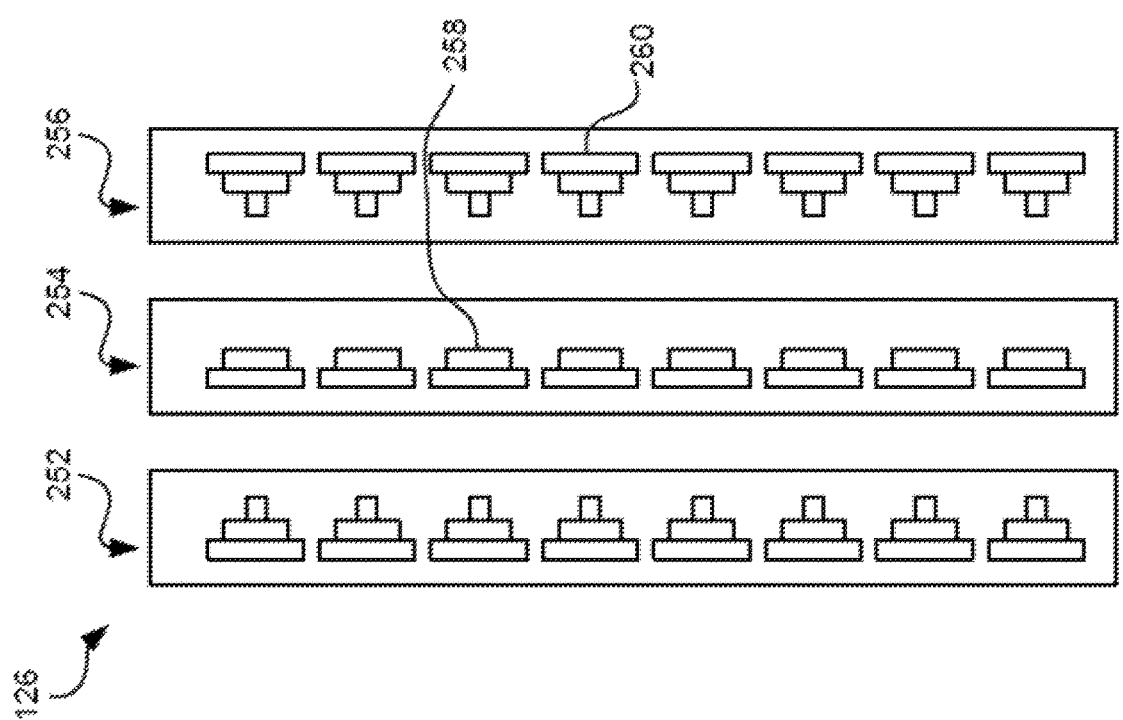
FIG. 3 is a partial tape bearing surface view of a magnetic head having a write-read-write configuration, in accordance with embodiments of the present disclosure.

The configuration of the tape head 126 according to some embodiments includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
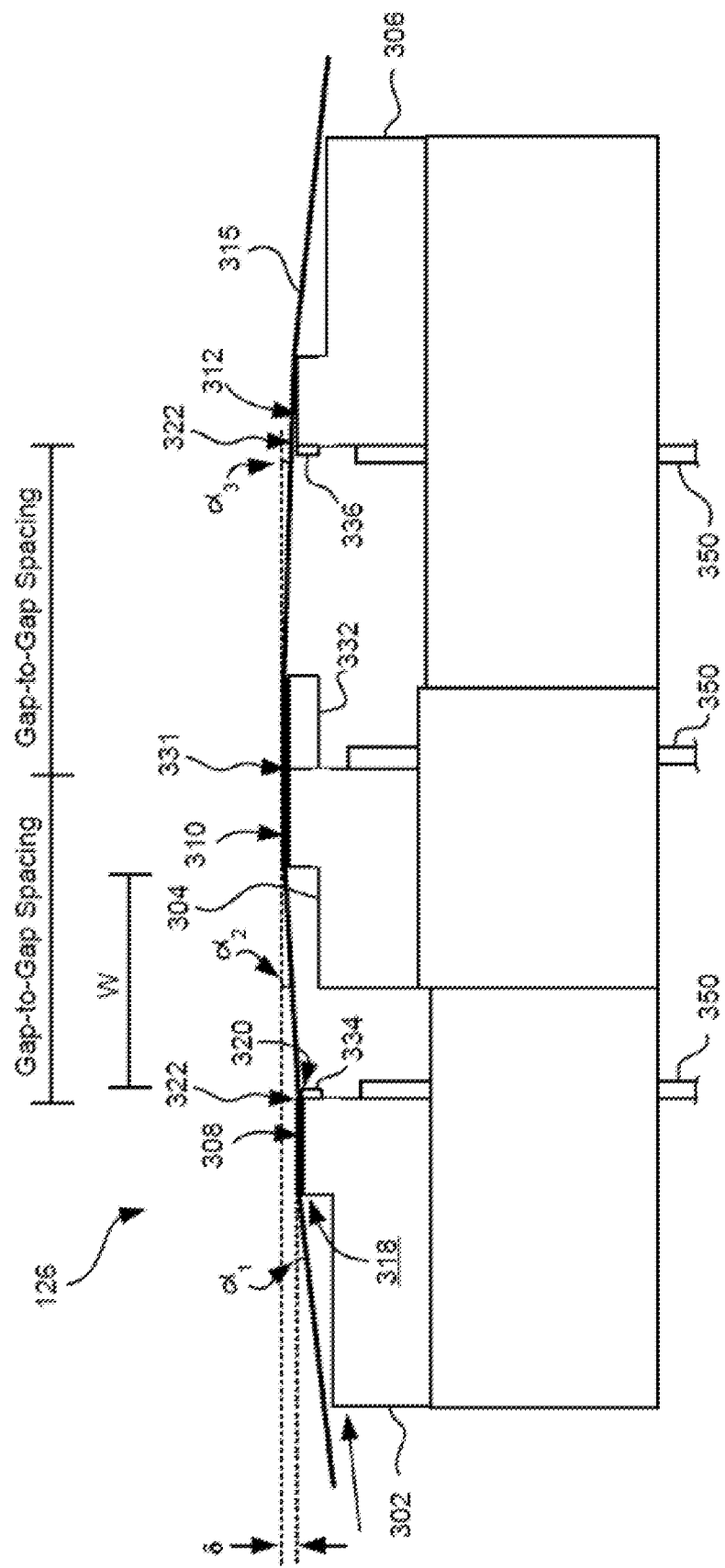
FIG. 5 is a side view of a magnetic tape head with three modules where the modules all generally lie along about parallel planes, in accordance with embodiments of the present disclosure.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
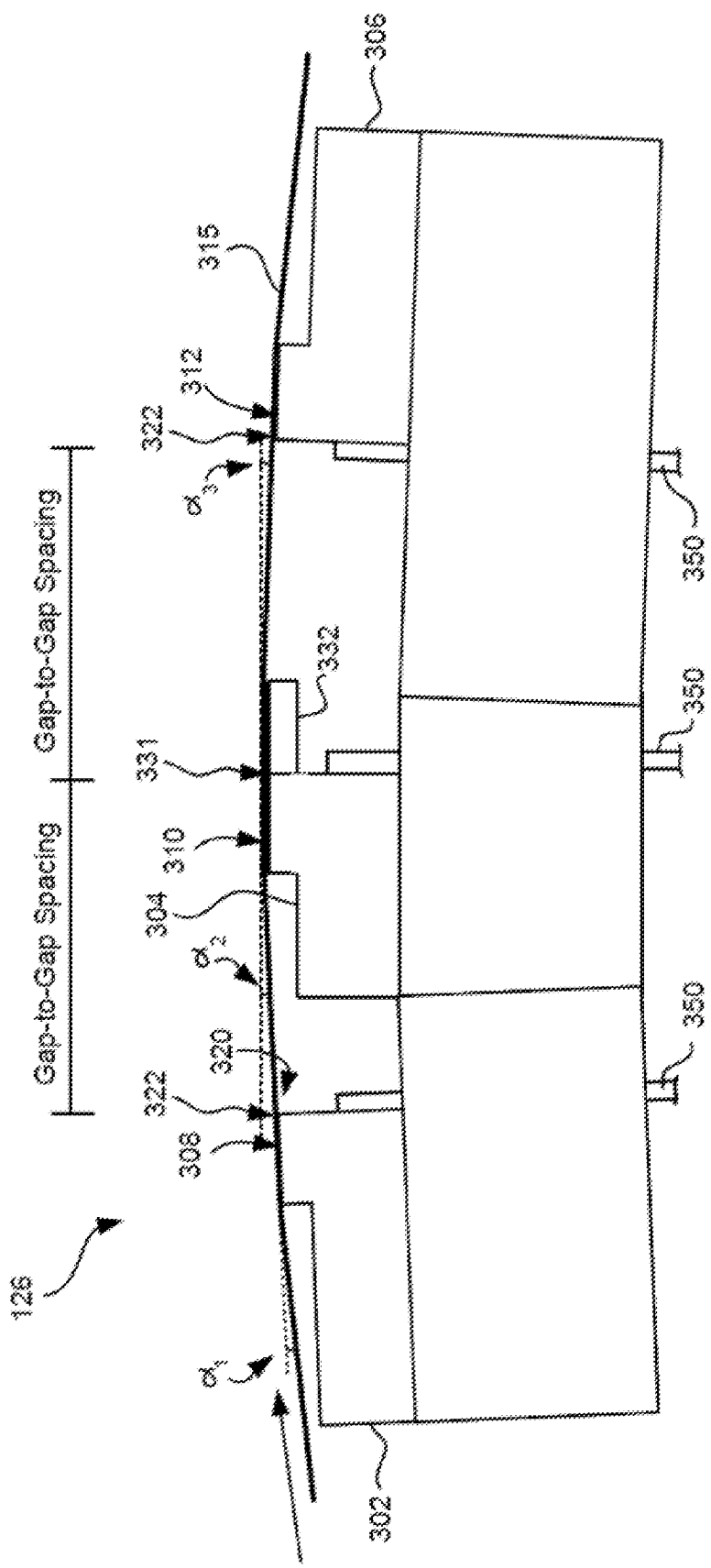
FIG. 6 is a side view of a magnetic tape head with three modules in a tangent (angled) configuration, in accordance with embodiments of the present disclosure.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, a hard coating may be added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
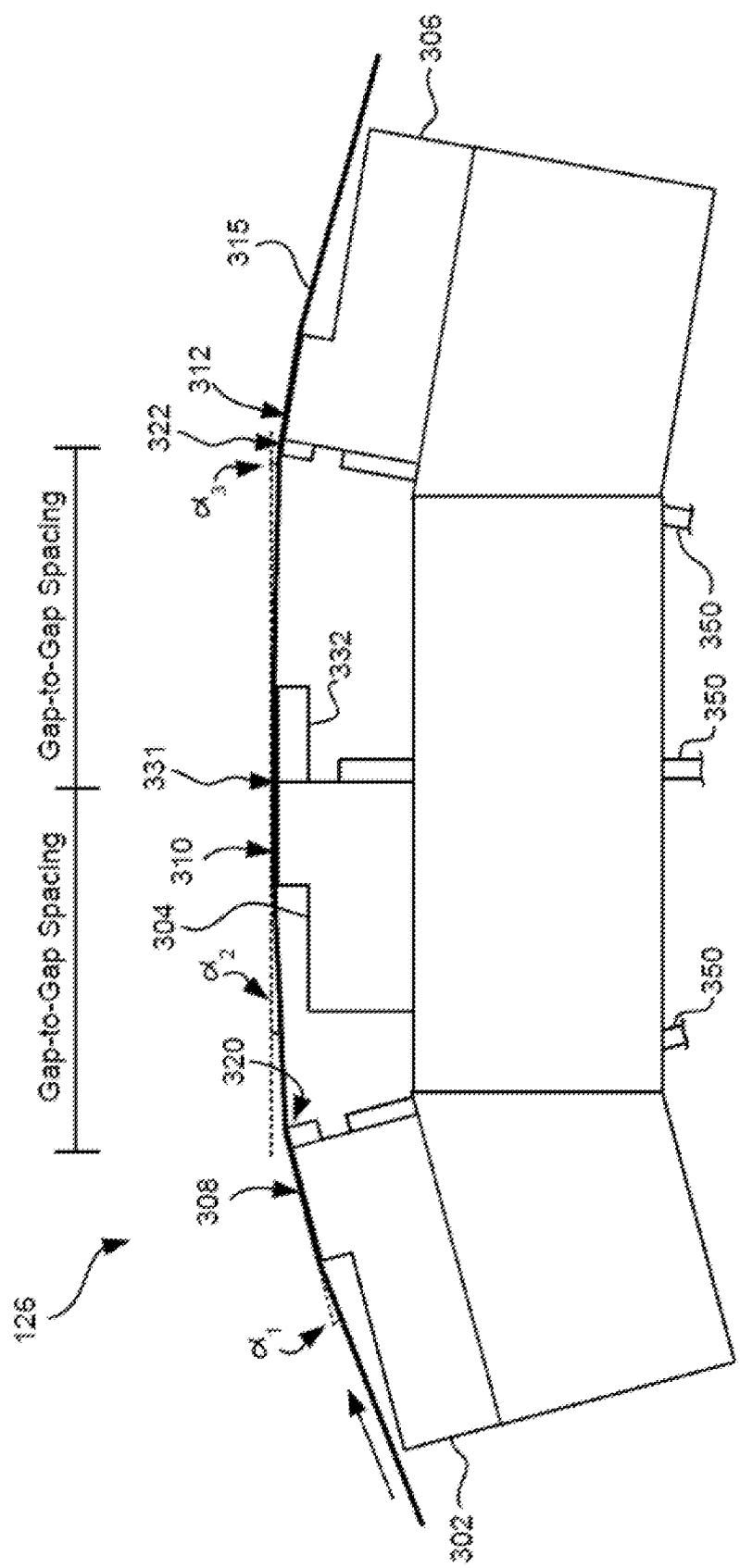
FIG. 7 is a side view of a magnetic tape head with three modules in an overwrap configuration, in accordance with embodiments of the present disclosure.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments may be preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
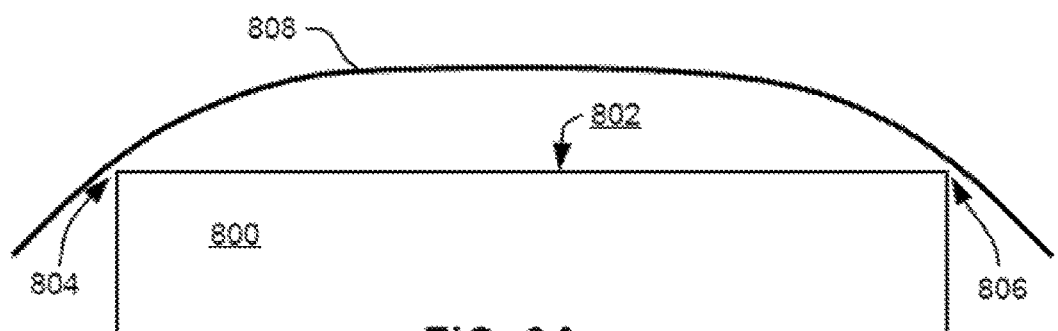
FIGS. 8A-8C are schematics depicting the principles of tape tenting, in accordance with embodiments of the present disclosure.
Figure 8B:
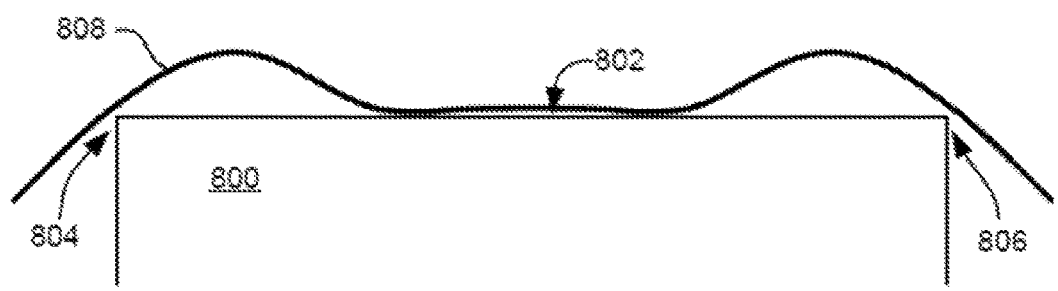
Figure 8C:
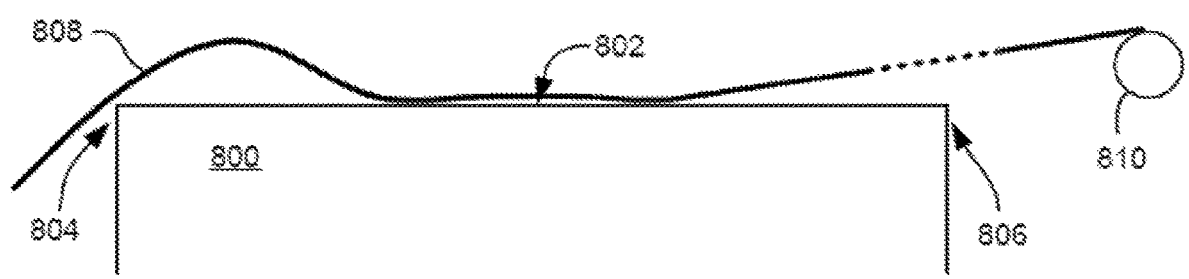

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
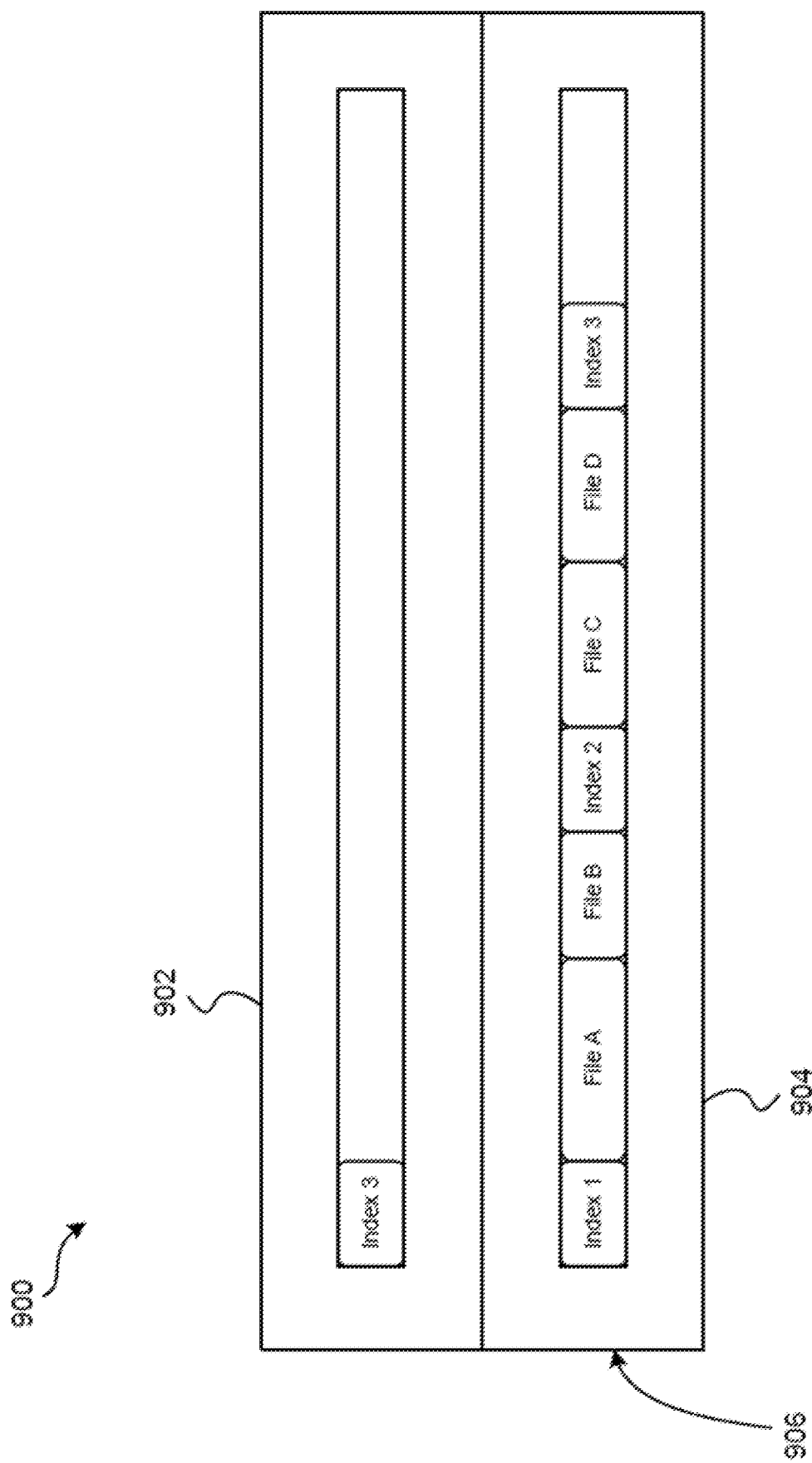
FIG. 9 is a representational diagram of files and indexes stored on a magnetic tape, in accordance with embodiments of the present disclosure.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

In some embodiments, as index information is updated, it overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. In some embodiments, the metadata is also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Figure 10:
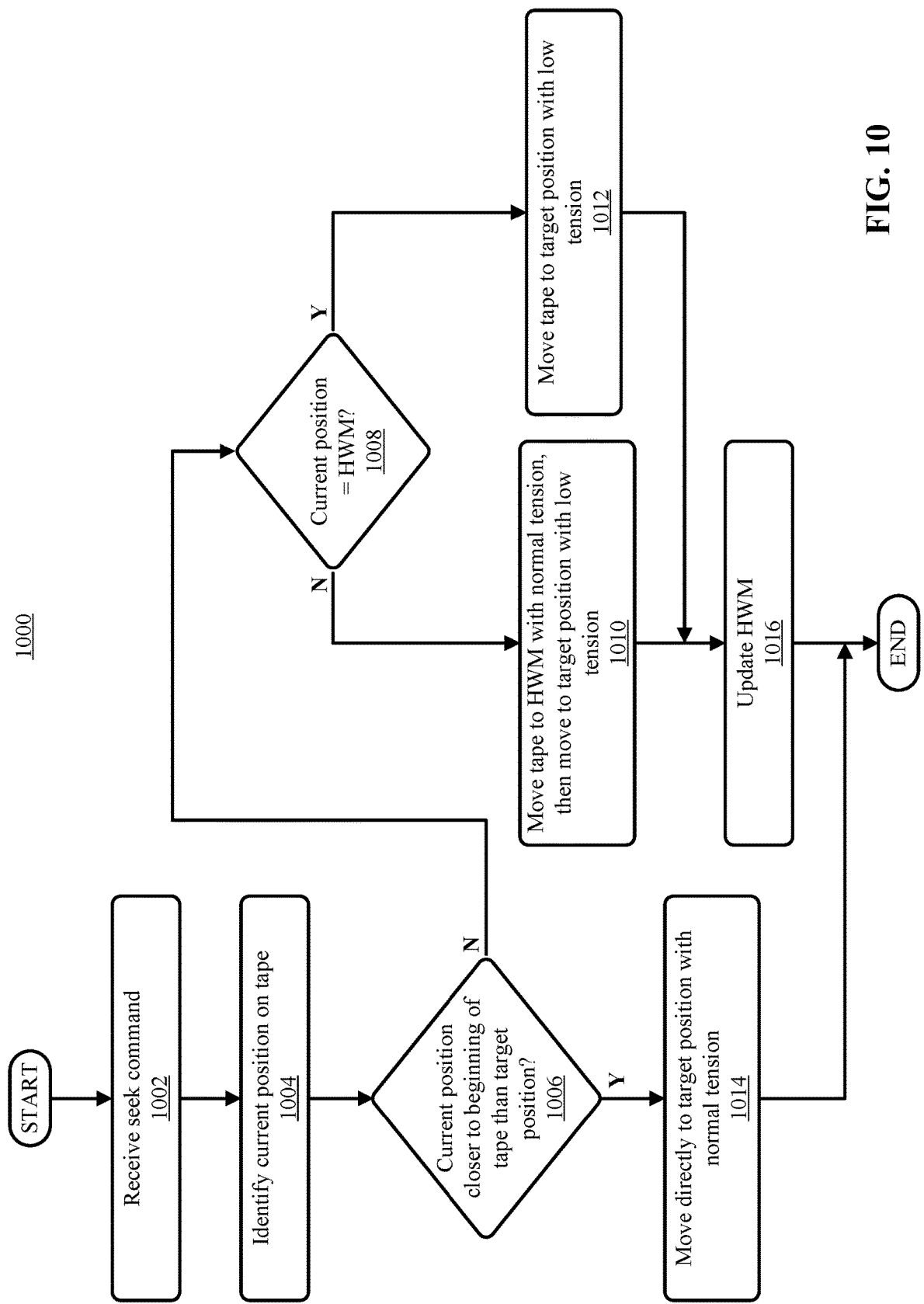
FIG. 10 depicts a flowchart of an example method for handling seek commands for a tape drive, in accordance with embodiments of the present disclosure.

FIG. 10 depicts a method 1000 for handling seek commands for a tape drive according to embodiments of the present disclosure. Method 1000 may be performed by processing logic that comprises hardware (e.g., circuitry, dedicated logic, programmable logic, microcode, etc.), software (e.g., instructions run on a processor to perform hardware simulation), firmware, and/or a combination thereof. In some embodiments, method 1000 may be performed by a processor or controller of the tape drive (e.g., controller 128 of FIG. 1A). While method 1000 is described below as being performed by a tape drive, in some embodiments, one or more operations of method 1000 may be performed by an external host computer in communication with the tape drive.

The method 1000 may begin at operation 1002, where a seek command is received by the tape drive. For example, a seek command for moving the tape to a target position may be received from a host computer via an interface (e.g., interface 134 of FIG. 1A). A seek command, as used herein, is a command (e.g., LOCATE, SPACE, and REWIND) for changing the current position of the tape in the tape drive (i.e., moving the tape from the current position to a target position).

At operation 1004, the tape drive may identify the current position of the tape in the tape drive. Generally, tape drives are configured to maintain the current position of the tape in the tape drive as commands are executed by the tape drive. In some embodiments, the tape drive maintains the current position in a memory (e.g. memory 136 of FIG. 1A) and identifying the current position of the tape drive includes reading the current position from the memory.

At operation 1006, the tape drive determines whether the current position on the tape is closer to the beginning of tape than the target position. In some embodiments, a value representing the current position on the tape is compared to a value representing the target position. For example, if the position values are greater toward the end of tape than the beginning of tape, the position values may be compared to determine which is greater.

If the current position is closer to beginning of tape than the target position, the tape drive may move the tape to the target position at normal tension, per operation 1014. For example, the controller of the tape drive may control the power to the motors driving the tape supply cartridge and the take-up reel to unwind the tape at the normal read/write tension.

If the target position is closer to beginning of tape than the current position, it is determined whether the current position is at the HWM, per operation 1008. For example, the current position may be compared to an HWM stored in a memory, such as memory 136 of FIG. 1A, to determine whether the positions are the same.

If the current position is at the HWM, the tape drive may move the tape to the target position with low tension, per operation 1012. For example, the tape drive may direct the motors controlling the supply reel and the take up reel to rewind the tape, until the target position is reached, at a low tension.

If the current position is not at the HWM, the tape drive may move the tape to the HWM with normal tension and then move the tape from the HWM to the target position at low tension, per operation 1010.

Based on moving the tape from the HWM to the target position with low tension in either operation 1010 or 1012, the tape drive may update the HWM to be the target position, per operation 1016. For example, the value of the HWM stored in a memory, such as memory 136 of FIG. 1A, may be overwritten with a value referencing the target position. As discussed herein, moving the HWM closer to the beginning of tape provides for a faster adaptive unload process when the tape is later unloaded from the tape drive.

Figure 11:
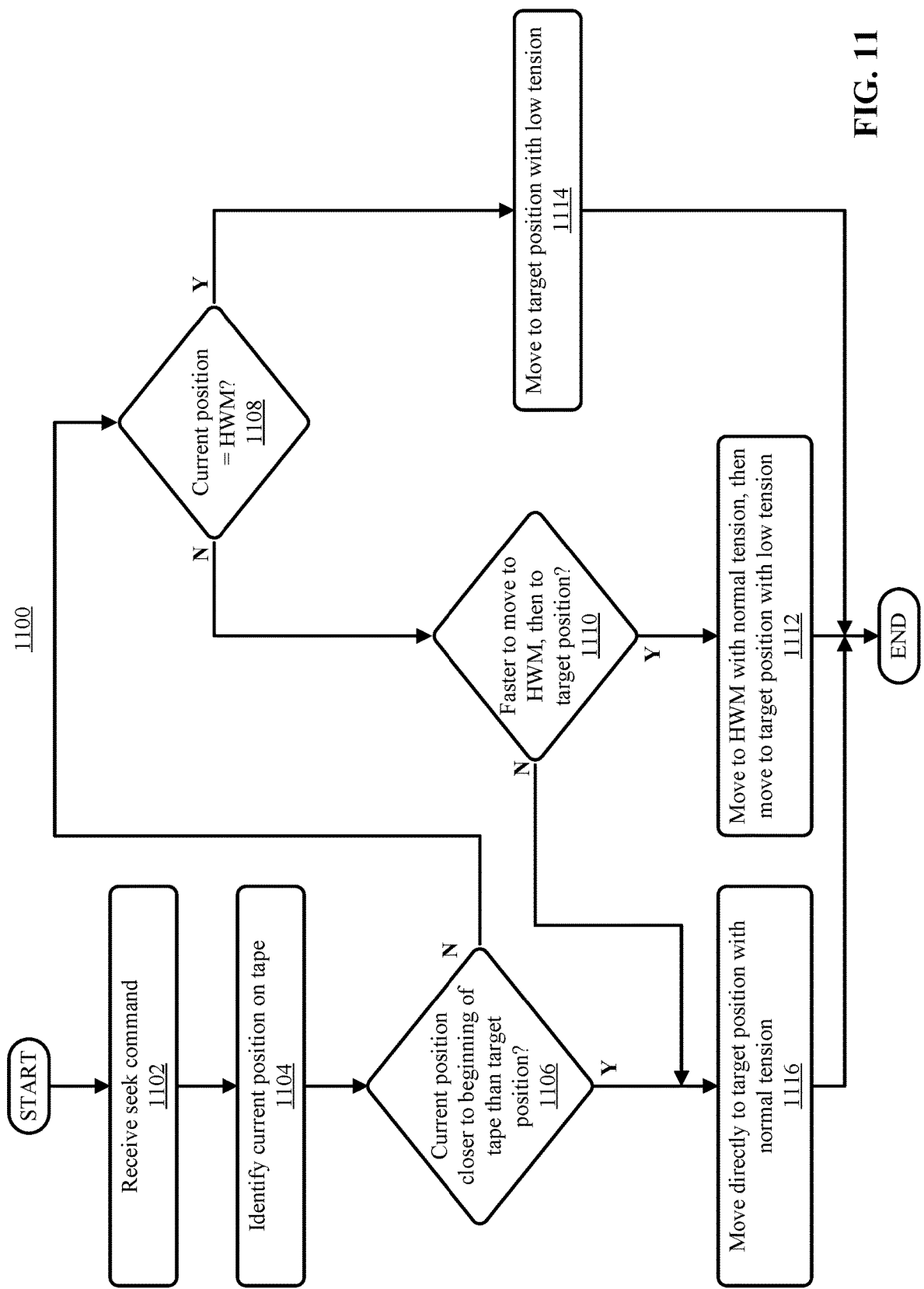
FIG. 11 depicts a flowchart of a second example method for handling seek commands for a tape drive, in accordance with embodiments of the present disclosure.

FIG. 11 depicts a method 1100 for handling seek commands for a tape drive according to embodiments of the present disclosure. Method 1100 may be performed by processing logic that comprises hardware (e.g., circuitry, dedicated logic, programmable logic, microcode, etc.), software (e.g., instructions run on a processor to perform hardware simulation), firmware, and/or a combination thereof. In some embodiments, method 1100 may be performed by a processor or controller of the tape drive (e.g., controller 128 of FIG. 1A). While method 1100 is described below as being performed by a tape drive, in some embodiments, one or more operations of method 1100 may be performed by an external host computer in communication with the tape drive.

The method 1100 may begin at operation 1102, where a seek command is received by the tape drive. For example, a seek command for moving the tape to a target position may be received from a host computer via an interface (e.g., interface 134 of FIG. 1A).

At operation 1104, the tape drive may identify the current position of the tape in the tape drive. Generally, tape drives are configured to maintain the current position of the tape in the tape drive as commands are executed by the tape drive. In some embodiments, the tape drive maintains the current position in a memory (e.g. memory 136 of FIG. 1A) and identifying the current position of the tape drive includes reading the current position from the memory.

At operation 1106, the tape drive determines whether the current position on the tape is closer to the beginning of tape than the target position. In some embodiments, a value representing the current position on the tape is compared to a value representing the target position. For example, if the position values are greater toward the end of tape than the beginning of tape, the position values may be compared to determine which is greater.

If the current position is closer to beginning of tape than the target position, the tape drive may move the tape to the target position at normal tension, per operation 1116. For example, the controller of the tape drive may control the power to the motors driving the tape supply cartridge and the take-up reel to unwind the tape at the normal read/write tension until the target position is reached.

If the target position is closer to beginning of tape than the current position, it is determined whether the current position is at the HWM, per operation 1108. For example, the current position may be compared to an HWM stored in a memory, such as memory 136 of FIG. 1A, to determine whether the positions are the same.

If the current position is at the HWM, the tape drive may move the tape to the target position with low tension, per operation 1114. For example, the tape drive may direct the motors controlling the supply reel and the take up reel to rewind the tape, until the target position is reached, at a low tension.

If the current position is not at the HWM, the tape drive may determine whether it is faster to move the tape to HWM and then the target position based on the speed of moving the tape at low tension and the speed of moving the tape at high tension, per operation 1110. As discussed herein, the speed of moving tape at low tension may be faster than moving the tape at normal tension. Thus, it may be faster to move the tape to the HWM at normal tension and then move the tape to the target position at low tension, instead of moving the tape directly from the current position to the target position. In embodiments, the speeds for moving tape at normal tension and low tension may be determined by the manufacturer of the tape drive and stored in a memory of the tape drive. In some embodiments, an equation is stored in the tape drive which is based on manufacturer determined speeds of moving the tape at normal tension and low tension.

In some embodiments, the time perform each operation may be calculated and compared to each other. For example, the distance on tape to travel from the current position to the target position may be divided by the speed of moving the tape at normal tension.

In some embodiments, an equation based on the speeds of moving the tape at normal tension and low tension may be programmed, stored, or otherwise provided on the tape drive which uses variables related to the current position, the HWM, and the target position for determining which procedure for moving the tape is faster. Example equations are described later herein.

If the tape drive determines that it is faster to move the tape directly to the target position, the tape drive may move the tape to the target position at normal tension, per operation 1116.

If the tape drive determines that it is faster to move the tape to the HWM and then to the target position, the tape drive may move the tape to the HWM with normal tension and then move the tape from the HWM to the target position at low tension, per operation 1112. As has been described herein, moving the tape from the HWM to the target position at low tension allows the tape drive to change the HWM to a position closer to the beginning of tape. Thus, method 1100 may provide benefits to both the processing time for seek commands and for performing a future adaptive unload process.

Figure 12:
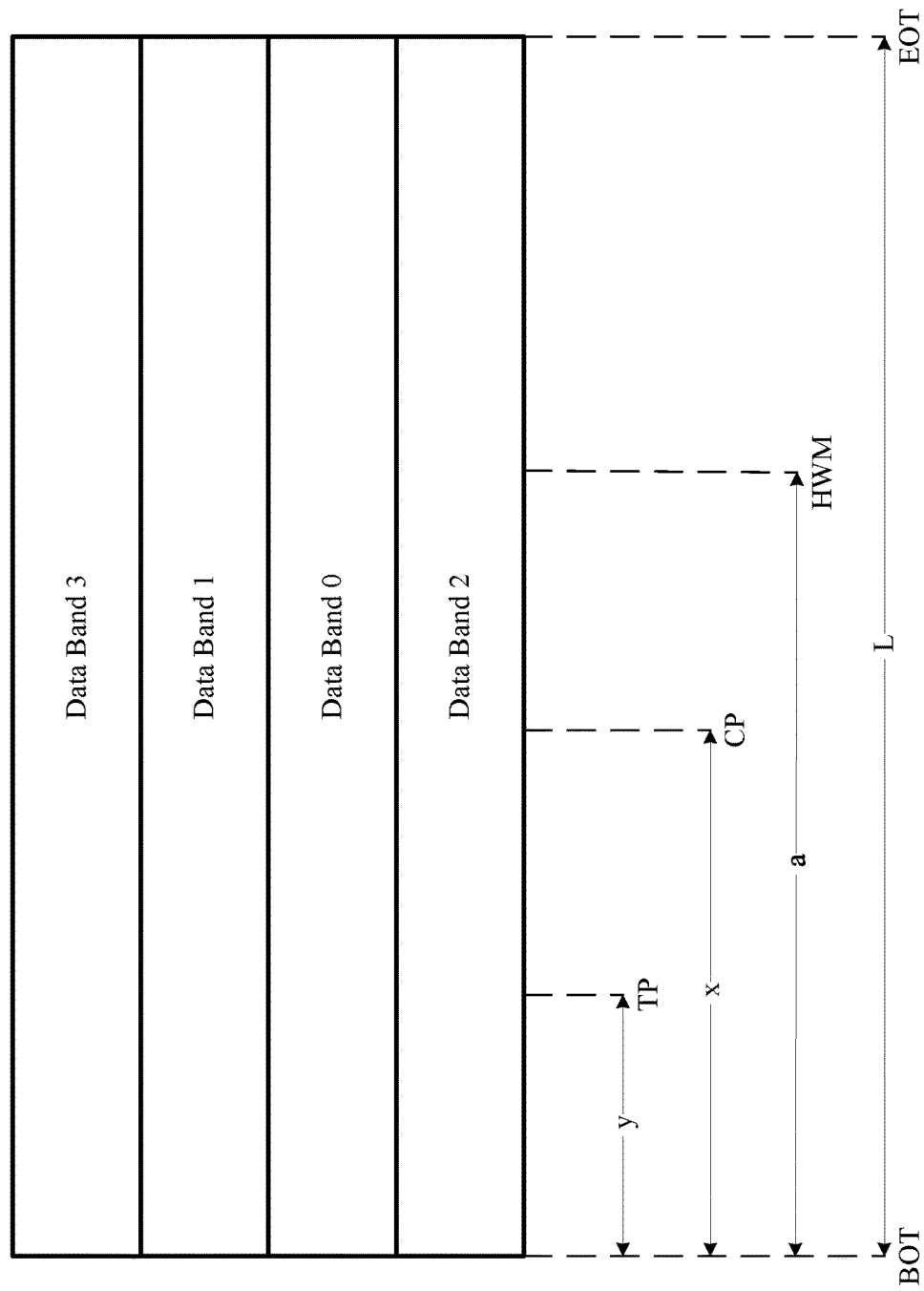
FIG. 12 depicts a representational diagram of tape, in accordance with embodiments of the present disclosure.

FIG. 12 depicts a representational diagram of a tape 1200 in accordance with embodiments of the present disclosure. As depicted, the distance from the beginning of tape to the end of tape is denoted by "L"; the distance from the beginning of tape to the HWM is denoted by "a"; the distance from the beginning of tape to the current position is denoted by "x"; and the distance from the beginning of tape to the target position is denoted by "y". In some embodiments, the beginning of tape and the end of tape refers to the beginning and end of the data writing portion of the tape and not the physical beginning and end of the tape. Additionally, in the following equations the speed of moving tape with normal tension is denoted by "$S_n$" and the speed of moving tape with low tension is denoted by "$S_l$".

The time ($t_{xy}$) required for moving the tape directly to the target position with normal tension is represented by the following equation:

$$t_{xy} = \frac{x-y}{S_n}$$

The time ($t_{xaz}$) required for moving the tape from the current position to the HWM with the normal tension and then rewind the tape to the target position with the low tension can be represented by the following equation:

$$t_{xay} = \frac{a-x}{S_n} + \frac{a-y}{S_l}$$

The condition in which the time required for moving the tape from x to a and then moving the tape to y with the weak tension becomes faster than the time required for moving the tape directly to the target position with the normal tension is represented by the following equation:

$$\frac{x-y}{S_n} > \frac{a-x}{S_n} + \frac{a-y}{S_l} \quad \text{(Equation 1)}$$

$$S_l(x-y) > S_l(a-x) + S_n(a-y)$$

$$2S_l x - (S_l - S_n)y > (S_l + S_n)a$$

$$a < \frac{2S_l x - (S_l - S_n)y}{(S_l + S_n)}$$

When the speeds of moving the tape at normal tension and low tension are known, the equation can be further simplified. For example, in some tape drives $S_n$=6 m/s and $S_l$=18 m/s. Thus, for a tape drive with these speeds, equation 1 becomes:

$$a < \frac{3x-y}{2} \quad \text{(Equation 2)}$$

Therefore, a tape drive with these speeds may be configured to move from the current position to the HWM, and then to the target position when equation 2 is satisfied given the distance from the beginning of tape to the current position (x), the distance from the beginning of tape to the HWM (a), and the distance from the beginning of tape to the target position (y).

In some embodiments, an allowable penalty time ($t_m$) can be predetermined and movement of the tape using the slower procedure may be allowed within the penalty time. For example, the manufacturer may determine that it is preferable to perform the procedure in which the tape is moved to the HWM prior to the target position, even if this procedure is slower, within a certain penalty time, based on the benefit of a faster adaptive unload procedure. In the case of an allowable penalty time, the equation becomes:

$$\frac{x-y}{S_n} + t_m > \frac{a-x}{S_n} + \frac{a-y}{S_l} \quad \text{(Equation 3)}$$

$$A < \frac{2S_l x - (S_l - S_n)y + S_l S_n t_m}{(S_l + S_n)}$$

Thus, the following equation is delivered when using the example speeds of $S_n$=6 m/s and $S_l$=18 m/s:

$$A < \frac{3x-y}{2} + 9t_m$$

As can be seen, Equation 1 can obtained by making $t_m$=0 in Equation 3. Thus, Equation 3 can be more generally used.

In some embodiments, the position values used by the tape drive may correspond to the distance of the position from the beginning of tape and thus may be directly used in the equations. In some embodiments, the tape drive may be configured to translate position values into values (e.g., distances from the beginning of tape) that can be entered into an equation such as those provided herein.

While the equations provided herein are based on using the beginning of tape as a reference point, some embodiments may use other equations that are developed based on a different reference point. For example, equations could be derived using the end of tape as a reference point.

Figure 13:
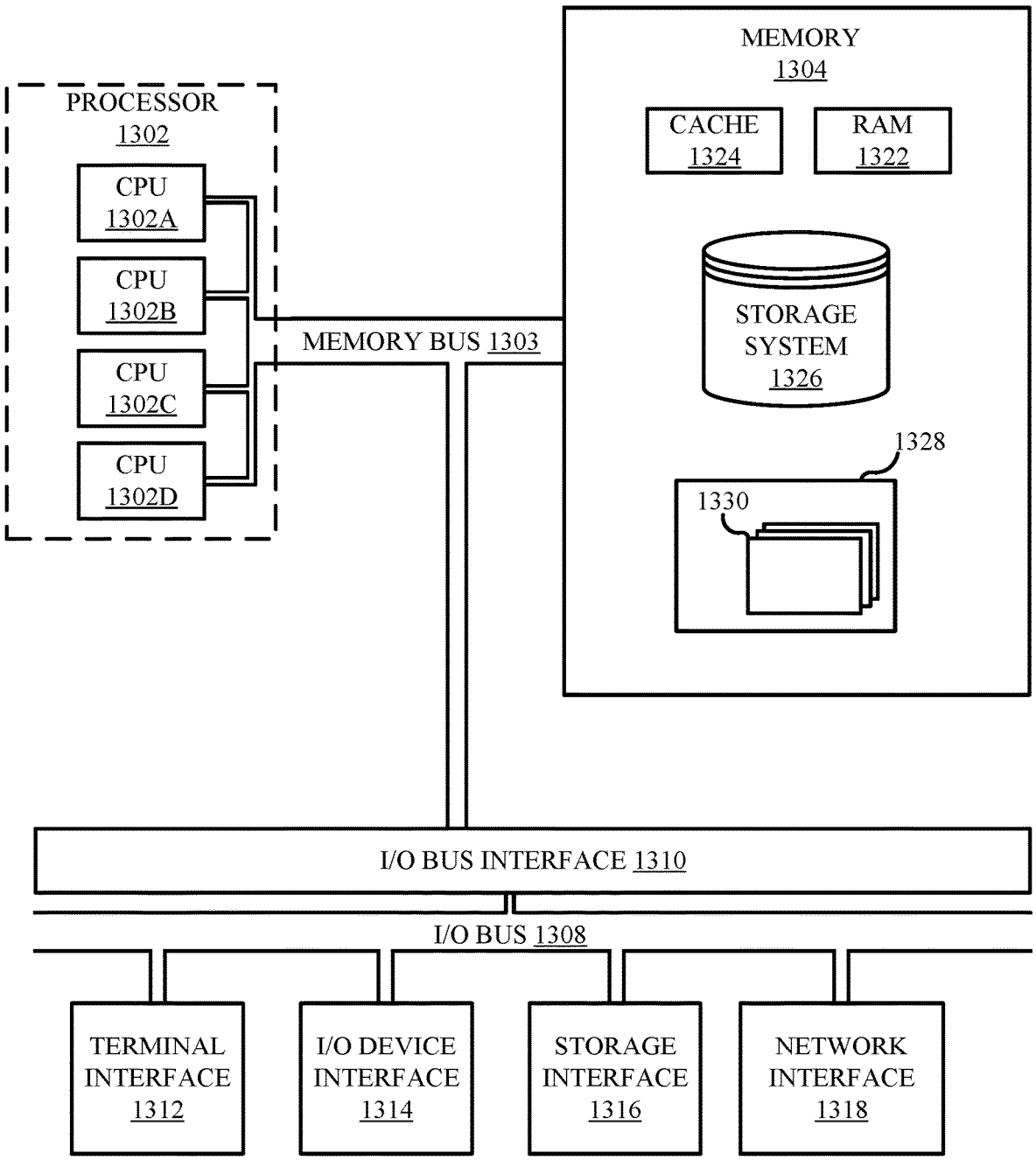
FIG. 13 depicts a high-level block diagram of an example computer system, in accordance with embodiments of the present disclosure.

Referring now to FIG. 13, shown is a high-level block diagram of an example computer system 1301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1301 may comprise one or more CPUs 1302, a memory subsystem 1304, a terminal interface 1312, a storage interface 1316, an I/O (Input/Output) device interface 1314, and a network interface 1318, all of which may be communicatively coupled, directly or indirectly, for inter-component communication via a memory bus 1303, an I/O bus 1308, and an I/O bus interface unit 1310.

The computer system 1301 may contain one or more general-purpose programmable central processing units (CPUs) 1302A, 1302B, 1302C, and 1302D, herein generically referred to as the CPU 1302. In some embodiments, the computer system 1301 may contain multiple processors typical of a relatively large system; however, in other embodiments the computer system 1301 may alternatively be a single CPU system. Each CPU 1302 may execute instructions stored in the memory subsystem 1304 and may include one or more levels of on-board cache.

System memory 1304 may include computer system readable media in the form of volatile memory, such as random access memory (RAM) 1322 or cache memory 1324. Computer system 1301 may further include other removable/non-removable, volatile/non-volatile computer system storage media. By way of example only, storage system 1326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1304 can include flash memory, e.g., a flash memory stick drive or a flash drive. Memory devices can be connected to memory bus 1303 by one or more data media interfaces. The memory 1304 may include at least one program product having a set (e.g., at least one) of program modules that are configured to carry out the functions of various embodiments.

One or more programs/utilities 1328, each having at least one set of program modules 1330 may be stored in memory 1304. The programs/utilities 1328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 1330 generally perform the functions or methodologies of various embodiments.

Although the memory bus 1303 is shown in FIG. 13 as a single bus structure providing a direct communication path among the CPUs 1302, the memory subsystem 1304, and the I/O bus interface 1310, the memory bus 1303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1310 and the I/O bus 1308 are shown as single respective units, the computer system 1301 may, in some embodiments, contain multiple I/O bus interface units 1310, multiple I/O buses 1308, or both. Further, while multiple I/O interface units are shown, which separate the I/O bus 1308 from various communications paths running to the various I/O devices, in other embodiments some or all of the I/O devices may be connected directly to one or more system I/O buses.

In some embodiments, the computer system 1301 may be a multi-user mainframe computer system, a single-user system, or a server computer or similar device that has little or no direct user interface, but receives requests from other computer systems (clients). Further, in some embodiments, the computer system 1301 may be implemented as a desktop computer, portable computer, laptop or notebook computer, tablet computer, pocket computer, telephone, smart phone, network switches or routers, or any other appropriate type of electronic device.

It is noted that FIG. 13 is intended to depict the representative major components of an exemplary computer system 1301. In some embodiments, however, individual components may have greater or lesser complexity than as represented in FIG. 13, components other than or in addition to those shown in FIG. 13 may be present, and the number, type, and configuration of such components may vary.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for handling seek commands for a tape drive, the method comprising:
   receiving a seek command for moving tape in the tape drive to a target position;
   determining, based on a current position of the tape, the target position, a high water mark for the tape, a first speed of moving the tape at a first tension, and a second speed of moving the tape at a second tension, whether to move the tape according to a first procedure or a second procedure, the first procedure including directly moving the tape from the current position to the target position with the tape at the first tension, the second procedure including moving the tape from the current position to the HWM with the tape at the first tension and moving the tape from the HWM to the target position with the tape at the second tension; and
   moving the tape according to the determined first or second procedure.

2. The method of claim 1, wherein the second tension is less than the first tension.

3. The method of claim 1, wherein the second speed is faster than the first speed.

4. The method of claim 1, wherein determining whether to move the tape according to the first procedure or the second procedure is in response to determining that the target position is closer.

5. The method of claim 1, wherein determining whether to move the tape according to the first procedure or the second procedure is in response to determining that the current position on tape is not the HWM.

6. The method of claim 1, wherein the determining whether to move the tape according to the first procedure or the second procedure includes determining whether it is faster to move the tape according to the first procedure or the second procedure.

7. The method of claim 1, wherein the determining whether to move the tape according to the first procedure or the second procedure includes determining whether it is faster to move the tape according to the first procedure or the second procedure within an allowable penalty time.

8. The method of claim 1, wherein the method further comprises updating the HWM to reference the target position in response to moving the tape according to the second procedure.

9. The method of claim 8, wherein the HWM is stored in a memory of the tape drive and wherein updating the HWM includes overwriting the HWM in the memory with a value representing the target position.

10. A computer program product comprising a computer readable storage medium having program instructions embodied therewith, the program instructions executable by processor to cause the processor to perform a method comprising:
 receiving a seek command for moving tape in the tape drive to a target position;
 determining, based on a current position of the tape, the target position, a high water mark for the tape, a first speed of moving the tape at a first tension, and a second speed of moving the tape at a second tension, whether to move the tape according to a first procedure or a second procedure, the first procedure including directly moving the tape from the current position to the target position with the tape at the first tension, the second procedure including moving the tape from the current position to the HWM with the tape at the first tension and moving the tape from the HWM to the target position with the tape at the second tension; and
 moving the tape according to the determined first or second procedure.

11. The computer program product of claim 10, wherein the second tension is less than the first tension.

12. The computer program product of claim 10, wherein the determining whether to move the tape according to the first procedure or the second procedure includes determining whether it is faster to move the tape according to the first procedure or the second procedure.

13. The computer program product of claim 10, wherein the determining whether to move the tape according to the first procedure or the second procedure includes determining whether it is faster to move the tape according to the first procedure or the second procedure within an allowable penalty time.

14. The computer program product of claim 10, wherein the method further comprises updating the HWM to reference the target position in response to moving the tape according to the second procedure.

15. The computer program product of claim 14, wherein the HWM is stored in a memory of the tape drive and wherein updating the HWM includes overwriting the HWM in the memory with a value representing the target position.

16. A system comprising:
 a memory; and
 a processor communicatively coupled to the memory, wherein the processor is configured to perform a method comprising:
  receiving a seek command for moving tape in the tape drive to a target position;
  determining, based on a current position of the tape, the target position, a high water mark for the tape, a first speed of moving the tape at a first tension, and a second speed of moving the tape at a second tension, whether to move the tape according to a first procedure or a second procedure, the first procedure including directly moving the tape from the current position to the target position with the tape at the first tension, the second procedure including moving the tape from the current position to the HWM with the tape at the first tension and moving the tape from the HWM to the target position with the tape at the second tension; and
  moving the tape according to the determined first or second procedure.

17. The system of claim 16, wherein the second tension is less than the first tension.

18. The system of claim 16, wherein the second speed is faster than the first speed.

19. The system of claim 16, wherein the method further comprises updating the HWM to reference the target position in response to moving the tape according to the second procedure.

20. The system of claim 19, wherein the determining whether to move the tape according to the first procedure or the second procedure includes determining whether it is faster to move the tape according to the first procedure or the second procedure.

* * * * *